Patented May 24, 1949

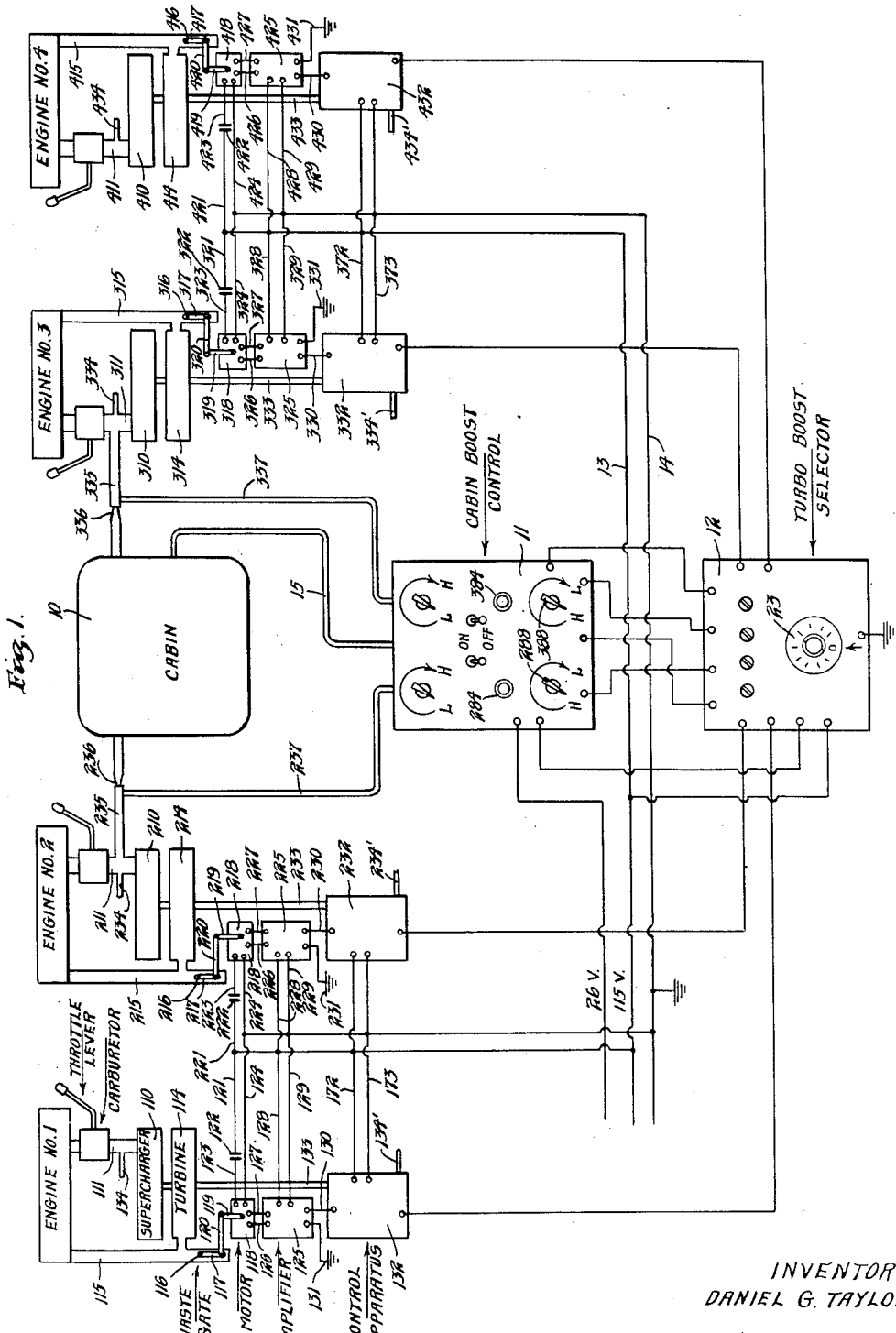

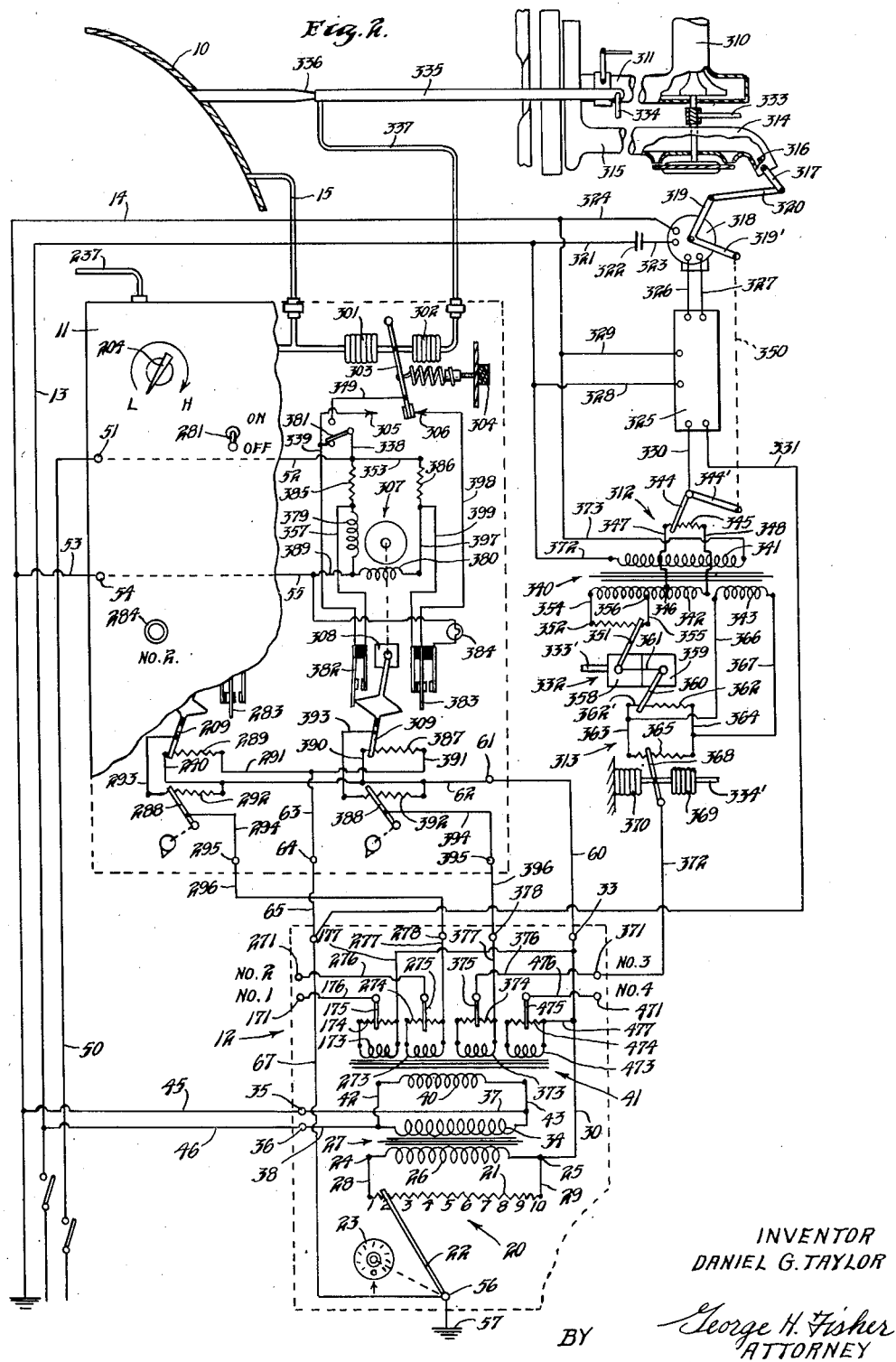

2,471,292

UNITED STATES PATENT OFFICE 2,471,292

AIRFLOW CONTROL APPARATUS FOR CABIN PRESSURIZING AND ENGINE SUPERCHARGING

Daniel G. Taylor, Minneapolis, Minn., assignor to Minneapolis-Honeywell Regulator Company, Minneapolis, Minn., a corporation of Delaware Application December 26, 1944, Serial No. 569,759

15 Claims. (Cl. 244—59)

This invention relates to control means for an aircraft supercharger and provides a variable low limit of supercharger discharge pressure determined by air flow into the aircraft cabin.

In the pressurizing of aircraft cabins, it has been found that an economical source of air under pressure is obtained by diverting a portion of the discharge air from one or more superchargers into the cabin. By providing suitable flow limiting means in the diverting conduit, to prevent the diverting of excessive quantities of air, the cabin pressure can be effectively controlled by suitable outlet valve means so long as the supercharger discharge pressure is above the pressure desired in the cabin. Depending on the value of the cabin pressure, the supercharger discharge pressure is ordinarily above the cabin pressure. However, under some conditions, such as cruising when lightly loaded, descending, or the like, the discharge pressure tends to fall below that necessary to maintain the cabin pressure. Under these conditions, air flow into the cabin diminishes or stops, thus preventing adequate cabin ventilation and the maintaining of the cabin pressure.

To prevent the supercharger discharge pressure from falling below that desired, it has been proposed to provide suitable control apparatus to establish a variable low limit of discharge pressure determined by air flow into the cabin, cabin pressure, or the like.

When the low limit of supercharger discharge pressure is above the pressure needed for desired engine power output, it is necessary to limit the engine power by partially closing a throttle. By this means, the engine power can be properly controlled even though the supercharger discharge pressure is relatively high. This type of operation has a penalty of somewhat decreased engine efficiency. The decrease in efficiency caused by throttling an engine emphasizes another object of this invention; namely, the provision of apparatus to automatically maintain the above mentioned low limit of discharge pressure. With automatic operation, the need for throttling an engine is reduced to a minimum, less manual attention is required by the apparatus, and engine efficiency is maintained as high as possible under the circumstances.

The present highly developed electronic supercharger control apparatus permits a single knob to control the supercharger discharge pressure of a plurality of engines simultaneously. However, air is usually diverted from the inboard engines only of a multi-engine aircraft, hence it is desirable, and it has been proposed to provide control apparatus which modifies the action of only the inboard engine superchargers in response to cabin air demands, thus permitting the outboard engines to operate at maximum efficiency at all times.

Because the compensation which is introduced into the turbo-supercharger control system requires a time interval for removing same, there may arise situations in which the engines might be endangered by excessive induction pressure. For instance, in descending for a landing with the inboard engines throttled and the turbo-supercharger control system for the inboard engines modified to maintain cabin pressure, an emergency might arise requiring full engine power. To get full power, the throttles will be opened and the turbo-supercharger boost control will be adjusted for the desired power setting. However, due to the compensation introduced into the system, the inboard engine superchargers may overspeed and may provide excessive induction pressure for a short period of time and cause damage to said engines, this being due to delay in removing the compensation from the control apparatus.

It is therefore a principal object of this invention to prevent damage to the inboard supercharger and engines by providing apparatus for suitably compensating the turbo-supercharger control means but of such nature that the compensation is automatically and simultaneously reduced as the turbo boost selector is adjusted for higher power settings. Thus it becomes impossible for the compensating means to endanger the engines under any circumstances. It follows that the amount of compensation may be automatically and simultaneously increased as the turbo boost selector is adjusted for lower power setting, thus tending to maintain air flow to the cabin at a desired value.

It is an additional object to provide apparatus of the above nature for modifying the control means of a turbo-supercharger wherein the rate of modification may be manually adjusted.

It is also an object to provide apparatus of the above nature for modifying the control means of a turbo-supercharger wherein the amount of permissible modification may be manually adjusted.

It is a further object to provide an inherently safe cabin boost control apparatus for compensating a turbo-supercharger control system.

These and other objects will become apparent upon a study of the following specification and related drawings.

In the drawing,

Figure 1 is a schematic view of the present control apparatus as applied to a four-engined aircraft, Figure 2 is a more specific schematic showing of the present control apparatus as applied to the No. 3 engine.

In Figure 1, pressurized cabin 10 is schematically shown in its normal position relative to the engines of a four-motored airplane. Engines 1 and 4 are outboard engines and engines 2 and 3 are termed inboard engines. As will be noted, cabin 10 is supplied air from the induction systems of engines 2 and 3. Obviously, cabin boost control 11 and turbo boost selector 12 are normally within cabin 10 and arranged to be operated by either the pilot or flight engineer, the present schematic arrangement being chosen for convenience only.

In the present description, it will be noted that apparatus common to a plurality of engines is numbered by numerals from 10 to 99; apparatus specific to engine No. 1 by numerals 100 to 199; apparatus specific to engine No. 2 by the same numerals as engine No. 1 increased by 100; and apparatus specific to engines 3 and 4 is numbered similarly to engine No. 1 but with additions of 200 and 300, respectively. As the basic turbo-supercharger control apparatus is similar for each of the engines, the following brief description of the apparatus of engine No. 3 will suffice for all, keeping in mind the above systems of numbering.

Engine No. 3 is furnished air by supercharger 310 through conduit 311 and a carburetor. The carburetor includes a suitable throttle lever, used in a manner to be described. Supercharger 310 is driven by an exhaust gas operated turbine 314, the exhaust gases being supplied through conduit 315. It is noted that conduit 315 also includes an outlet portion communicating with the atmosphere, said outlet portion being controlled by waste gate 316 operated by lever 317. When waste gate 316 is wide open, exhaust gases pass freely through conduit 315 to the atmosphere and no power is developed by turbine 314. However, as the waste gate is closed, the exhaust gases are forced to flow through said turbine and cause rotation of same at high speed. Turbine 314 is connected in driving relation to supercharger 310, hence closing waste gate 316 is seen to operate 310 and provide air under increased pressure for the engine. Waste gate 316 is thus seen to be the effective control means for the supercharger discharge pressure, and the present control apparatus is used to properly position said waste gate. Although this is the preferred manner of controlling discharge pressure, it is not the only one that can be used, throttling the inlet to the supercharger also being feasible, for instance.

Waste gate 316 is adjusted by motor 318 operating waste gate lever 317 by lever 319 and link 320. Motor 318 is of the two-phase reversible type wherein the operation of same and direction of rotation depend on the phase relation of the currents supplied the windings of said motor. One of the motor windings is supplied from the line by the circuit: line wire 13, wire 321, condenser 322, wire 323, motor 318, wire 324, and line wire 14. The other winding of the motor 318 is supplied current from amplifier 325 by wires 326 and 327. As is characteristic of two phase motors, motor 318 will not operate when the phase of the current supplied from amplifier 325 is the same as that supplied from the line wires, nor, of course, will it operate when current is furnished only one winding or when no current is furnished. However, if the current supplied through wires 326 and 327 leads that supplied through wires 323 and 324, rotation will take place in one direction, whereas if the current from amplifier 325 lags that supplied from wires 323 and 324, rotation will occur in the opposite direction. Obviously, motor 318 operates lever 319 through a gear train, not separately shown.

Amplifier 325 may be of any suitable type which will maintain the same phase relation in its output current as is possessed by its input signal. Such amplifiers are well known in the art; as an example of this type of amplifier, reference is made to the copending application of Albert P. Upton, Serial No. 437,561, filed April 3, 1942, Patent No. 2,423,534, issued July 8, 1947; or to the Chambers Patent 2,154,375. Current for operation of amplifier 325 is supplied by the circuit: line wire 13, wire 328, amplifier 325, wire 329, and line wire 14. The signal input source for amplifier 325 comprises wire 330 and grounded wire 331, wire 330 leading from control apparatus collectively identified by the numeral 332.

Control apparatus 332, as shown in Fig. 1, responds to the speed of rotation of turbine 314, transmitted through shaft 333, and to induction pressure in conduit 311 by connection through tubes 334 and 334'. Control apparatus 332, in conjunction with cabin boost control 11 and turbo boost selector 12, determines the phase of the signal supplied amplifier 325, as will be more fully explained as the description proceeds.

In addition to supplying air for engine No. 3, supercharger 310 also supplies air for cabin 10. Conduit 335 diverts air from conduit 311 into cabin 10. Conduit 335 includes a flow sensing and limiting venturi 336. Air pressure upstream of venturi 336 is communicated to cabin boost control 11 by tube 337, while the downstream pressure, or the cabin pressure, is communicated to control 11 by tube 15. Tube 15 may be connected in the throat of venturi 336 but more stable action is obtained by the connections shown. Here, too, it is apparent that other sorts of flow sensing and limiting means may be used, the present apparatus being illustrative only.

The nature of control apparatus 332, as well as cabin boost control 11 and turbo boost selector 12, is more fully shown in Figure 2.

Apparatus 332 comprises two electrical networks 312 and 313 connected in series, both of the networks being energized by a plural secondary transformer 340. Transformer 340 includes primary winding 341 and secondary windings 342 and 343. The primary winding is energized from line wires 13 and 14 by wires 372 and 373, respectively. A follow-up potentiometer comprising wiper 344 and resistor 345 is connected to secondary winding 342 by the circuit: intermediate tap 346 of winding 342, wire 347, resistor 345, wire 348, and the right-hand terminal of winding 342. Wiper 344 is connected to wire 330 and is moved by arm 344'. Arm 344' is shown connected to arm 319' by link 350 so that wiper 344 assumes a position dependent on that of waste gate 316. Wiper 344 is at the left side of resistor 345 when waste gate 316 is open. In practice, this follow-up potentiometer is included in the same casing as motor 318 and is operated by its output shaft, the present arrangement being made only for convenience.

A potentiometer including wiper 351 and resistor 352 is also connected to winding 342, the circuit being: the left-hand terminal of winding 342, wire 354, resistor 352, wire 355, and intermediate tap 356 of said winding. Wiper 351 is actuated by an overspeed responsive device 358, said device being driven from the turbine 314 by shaft 333 and its extension 333'. When the turbine assumes an overspeed condition, wiper 351 is moved to the left. Network 312 is seen to comprise wiper 344, resistor 345, transformer secondary 342, resistor 352 and wiper 351.

Associated with overspeed responsive device 358 is acceleration responsive device 359, this latter device also being driven by shaft 333'. Device 359 positions wiper 360 in response to the acceleration of turbine 314 and it, in combination with overspeed responsive device 358, comprises the protective means for turbine 314. Any suitable speed and acceleration responsive devices may be used, one suitable type being that disclosed in Sparrow application, Serial No. 476,797, filed February 22, 1943. Wiper 360 is connected in series with wiper 351 by wire 361.

Wiper 360 is moved to the right across resistor 362 in response to acceleration of turbine 314, the initial movements of same having no effect because of a low resistance slide portion or "dead spot" 362' at the left hand end of said resistor. The left end of resistor 362 is connected to wire 363 and the right end of same is connected to wire 364, and a second resistor 365 is connected in parallel with resistor 362 from wire 363 to 364. Wires 363 and 364 are connected to the terminals of transformer secondary winding 343 by wires 366 and 367, respectively. Resistor 365 is swept over by wiper 368. It will be noted that resistor 362, wire 364, resistor 365 and wire 363 form a bridge type network 313 with wires 366 and 367 as the input current supply means and wipers 360 and 368 forming the output terminals. Wiper 368 is moved across resistor 365 in response to variations in induction pressure by expansible bellows 369, said bellows being connected to the discharge of supercharger 310 by tube 334 and its extension 334', movement being to the left with increase in said pressure. Opposing bellows 369 is an evacuated spring operated bellows 370, bellows 370 being used to neutralize the effect of varying ambient pressure on bellows 369. Wiper 368 is connected to terminal 371 of turbo boost control 12 by wire 372.

Turbo boost selector 12 comprises a main potentiometer 20 having a resistor 21 and wiper 22. Wiper 22 is adjusted by manually operated knob 23 and is connected through terminal 56 to ground 57. Resistor 21 is connected to terminals 24 and 25 of secondary winding 26 of a transformer 27 by wires 28 and 29, respectively. Terminal 25 is also connected by wire 30 to terminal 33 of control 12. Primary winding 34 of transformer 27 is connected to terminals 35 and 36 of control 12 by wires 37 and 38, respectively. A primary winding 40 of transformer 41 is connected in parallel with primary winding 34 of transformer 27 by wires 42 and 43. Transformer 41 includes a plurality of secondaries 173, 273, 373, and 473 across terminals of which are connected in parallel resistors 174, 274, 374, and 474, respectively. Wipers 175, 275, 375, and 475 coact with resistors 174, 274, 374, and 474, respectively, to form calibrating potentiometers for the individual turbo control circuits. Wipers 175, 275, 375, and 475 are connected to terminals 171, 271, 371, and 471 by wires 176, 276, 376, and 476, respectively. The right hand terminals of resistors 174 and 474 are connected to wire 30 by wires 177 and 477, respectively, and the right hand terminals of resistors 274 and 374 are connected to terminals 278 and 378 by wires 277 and 377, respectively. The present arrangement of the calibrating potentiometers is but one of several that may be used, as will be apparent to those skilled in the art. The numerals below and along resistor 21 are for convenience in adjusting wiper 22.

Current input terminals 35 and 36 of control 12 are connected to line wires 14 and 13 by wires 45 and 46, respectively.

While turbo boost selector 12 permits simultaneous adjustment of the supercharger discharge pressure of all four engines, cabin boost control 11 may modify the control of the inboard engine superchargers in a manner to be described. Cabin boost control 11 is, in this description, arranged to modify the control of two superchargers hence it comprises two identical sets of apparatus. As the turbo control apparatus has been described for the turbo-supercharger of engine No. 3, only the apparatus of control 11 pertinent to engine No. 3 will be described, it being kept in mind that the apparatus for engine No. 2 is similar in structure and function. While control 11 shows separate adjustment means for each of the inboard engines, it is noted that the pairs of control adjustments may be combined if desired.

Cabin boost control 11 includes means responsive to the differential of pressure existing between tubes 15 and 337, said means comprising bellows 301 and 302, connected to tubes 15 and 337, respectively. Switch arm 303, biased to the right by adjustable spring means 304, is operated by the resultant of the forces exerted by bellows 301 and 302, the arm moving to the right when the differential pressure is low and moving to the left when said differential pressure is high. Switch arm 303 operates between contacts 305 and 306 to control the operation of motor 307. Contacts 305 and 306 are rather widely spaced so that an electrical dead spot exists between them, thus permitting some fluctuation of pressure without causing motor 307 to operate.

Motor 307 is of a reversible two-phase type and operates through gear train 308 to position potentiometer wiper 309. Motor 307 includes a pair of field windings 379 and 380 and the operation and direction of rotation of said motor depends on the phase relation of the currents supplied said windings. Also associated with motor 307 for control of same is a manually operated switch 381, a pair of limit switches 382 and 383, and a signal light 384. A fixed resistor 385 is connected in series with winding 379 and a similar resistor 386 is connected in series with winding 380. If the windings 379 and 380 be energized through their respective resistors, no rotation will take place because the current supplied each winding is the same in phase. However, if one of the resistors be shunted out, then the current supplied the winding in series with said shunted resistor will lead that supplied the other winding, and the motor will operate in one direction. If said resistor be returned to its series connection and the other resistor shunted out, the motor will operate in the opposite direction. The operation of this motor will become more clear when its energizing circuits are traced in the operating schedule following the present description. It is noted that the boost control 11 is energized from 26 volt line wire 50 to terminal 51 and line wire 14 and wire 53 to terminal 54.

Motor positioned wiper 309 moves across resistor 387 and introduces more or less compensating signals to the turbo control apparatus depending on the position of said wiper, the position of wiper 22, and the position of manually adjusted wiper 388. The left end of resistor 387 is connected to wire 62 by wire 390 and the right end of same is connected by wire 391 to wire 63. Wire 63 connects through terminal 64, wire 65, terminal 66, wire 67, and terminal 56 to ground 57, while wire 62 connects through terminal 61, and wire 60 to turbo boost control terminal 33. Manually adjustable wiper 388 coacts with resistor 392, the right end of which is connected to wire 62 and the left end of which is connected to wiper 309 by wire 393. Wiper 388 is connected by wire 394, terminal 395, and wire 396 to turbo boost control terminal 378.

It is noted that the present turbo-supercharger control system is similar to that disclosed in the copending application of Hubert T. Sparrow et al., Serial No. 486,992, filed May 14, 1943, now Patent No. 2,466,282, issued April 5, 1949, and reference is made to said patent for a more complete description of said system.

Further, as previously made clear, the apparatus for control of the supercharger of engine No. 2 is similar to that described for engine No. 3.

While the present system has been described in relation to a multi-engined aircraft, it may also be used in a single engined aircraft if it be desired to provide an adjustable low limit of supercharger discharge pressure for cabin ventilation, pressurizing, or the like.

To more fully explain the present invention, the following operation schedule describes the operation of the present apparatus under operating conditions.

Operation

In considering the operation of the present control apparatus, it will be noted that the various elements of the apparatus are in their positions of rest, with the airplane stationary and at sea level. Wiper 22 of turbo boost selector 12 is adjusted for zero boost, the induction pressure responsive device shows its wiper 368 at a position indicative of atmospheric pressure, the acceleration responsive means 359 has its wiper 369 in a position indicating no acceleration, the overspeed responsive device 358 indicates no overspeed, waste gate 316 is wide open, and wiper 344 of the follow-up potentiometer is at its extreme left of travel. Further, the switch for the cabin boost control 381 is in its "off" position and wiper 309 is in a position to add no compensating effect to the turbo boost control system.

As before noted, operation of the waste gate motor 318 depends upon whether or not amplifier 325 is furnishing a signal voltage to the same. Further, the direction of operation of said motor depends upon the phase relation of the current supplied the motor by the amplifier as compared to that of the line current. Since the phase relation of the output of the amplifier depends upon that of the input, an analysis of the control networks will determine whether or not a signal is being supplied said amplifier and the phase relation of same. To expedite a consideration of these networks, the instantaneous current relation existing in the networks during a half cycle may be considered. Then, the left end of each of the networks may be considered negative in potential and the right end positive. Considering the operation of a network on a half cycle basis, it may be determined whether or not there is a signal resulting from same and the signal will then appear to be either positive or negative in potential. However, with alternating current, a signal which is negative in potential in one instant becomes, a half cycle later, positive in potential. It is thus obvious that what appears to be positive and negative signals actually represents signals 180° different in phase. Therefore, while it is noted that signals of one phase relation will cause the waste gate motor to operate in one direction, and signals of another phase relation will cause said motor to operate in the opposite direction, in this analysis, signals having a positive potential will cause the waste gate motor to operate toward open position and signals having a negative potential will cause said waste gate to be closed.

With a 30 volt potential existing across resistor 21, wire 30 is 30 volts positive relative to wiper 22. Assuming that the wipers of each of the calibrating potentiometers is at a potential 2 volts less than that at the right extreme of their respective resistors, then wiper 475, wire 476, and terminal 471, for instance, would be at a potential of 28 volts positive above wiper 22. Following wire 38 through terminal 33, wire 60, terminal 61, wire 390, wiper 309, wire 393, wiper 388, wire 394, terminal 395, wire 396, terminal 378, wire 377, resistor 374, wiper 375, wire 376, and terminal 371, it is seen that the potential at terminal 371 will also be 28 volts positive relative to wiper 22 for the direct connection through cabin boost control 11 made no change in the control signal. It is thus noted that with the adjustments of cabin boost control 11 in the positions shown, with wiper 309 at the extreme left of resistor 389, and wiper 388 at the extreme left of resistor 392, the cabin boost control is, for all practical effects, nonexistent, and the turbo boost control apparatus may be considered in its normal operation. It should be noted that this normal operation of the present turbo boost control is representative of the control apparatuses relating to each of the other engines.

It has now been determined that the voltage signal from the turbo boost control 12 is 28 volts positive. Assuming a 30 volt potential existing across resistors 362 and 365, it appears that wiper 360 is about 10 volts negative relative to wiper 368; therefore the output of network 313 is 10 volts negative. Considering that tap 346 is about six volts positive relative to tap 356, then from the position shown, wiper 344 is about six volts positive relative to wiper 351; hence the output of network 312 is six volts positive. Adding these voltage signals, because the networks are connected in series, it appears that amplifier 325 is provided at its input terminals with a signal of about 24 volts positive. It was previously pointed out that positive signals tend to open the waste gate, therefore, the waste gate remains wide open, further operation beyond wide open position of motor 318 being prevented by internal limit switches (not shown).

Assume now that the aircraft is being prepared for the take-off. As the power output of the engines is increased preparatory to the beginning of the flight, it is obvious that the added rate of airflow through the induction system will cause the induction pressure to drop. As will be noted, as wiper 368 moves to the right, wiper 360 becomes more negative relative thereto; however, as the total travel of wiper 368 to the right from its previous position permits a change of only about 20 volts, this in itself cannot cause operation of the waste gate motor. For the take-off of the aircraft, a high power output is ordinarily required from the engines, so let it now be assumed that wiper 22 is moved across resistor 21 to the right to position 8 so that wire 30 is only 6 volts more positive than said wiper. Then, assuming that the parts of the cabin boost control remain in their previous position, the potential at terminal 371, wire 372 and wiper 368 is only 4 volts positive relative to wiper 22. Now, if wiper 368 of the induction pressure responsive controller has moved to a mid-position on resistor 365, and there has been no excessive acceleration, wiper 360 is now 15 volts negative relative to wiper 368 and the output of network 313 is 15 volts negative. Further, assuming that wipers 351 and 344 are in their previous positions, then wiper 344 is about 6 volts positive relative to wiper 351. Hence the output of network 312 remains 6 volts positive. Adding these voltage signals, it is noted that there is now a negative signal of about 5 volts impressed on amplifier 325. The negative signal causes operation of motor 318 to close the waste gate and to adjust the follow-up potentiometer so that wiper 344 moves to the right across resistor 345. With the conditions as previously stated, motor 318 would continue to close waste gate 316 and wiper 344 would be moved across resistor 345 until said wiper 344 becomes about 11 volts positive relative to wiper 351. At this point, the positive signals and the negative signals of the networks would be in balance and there would be no resulting signal to the amplifier. However, as the waste gate moves toward closed position, the induction pressure rises and wiper 368 is moved toward the left. This diminishes the negative signal and therefore decreases the amount of movement required by wiper 344 to the right to balance the system.

Up to this point, it has been assumed there was no excessive acceleration nor was there any overspeed. Obviously, closing movement of the waste gate increases the speed of the turbine and, assuming that the rate of increase may be unduly rapid, wiper 360 is moved to the right across resistor 362. Because of the dead spot in the left portion of resistor 362, the initial movement of wiper 360 has no change in the signal condition, but further movement to the right tends to make wiper 360 less negative with respect to 368 and thus to remove the negative signal which causes waste gate closing. Should wiper 360 move to the right of wiper 368 then it would become positive relative to said wiper 368 and would further tend to cause opening of the waste gate. Likewise, movement of wiper 351 to the left due to overspeed tends to make wiper 344 more positive relative to said wiper 351 and thus cause opening of the waste gate. Opening of the waste gate permits more of the exhaust gases to by-pass the turbine and thus causes the turbine to decelerate.

As before stated, the above description of operation of the turbo boost control system is that which normally applies to each of the superchargers of the aircraft, ignoring the cabin boost control. Thus, when the switches of the cabin boost control are turned to "off" the turbo superchargers of each of the engines of the aircraft may be simultaneously controlled by the turbo boost selector in the manner described. For a more detailed description of operation of this turbo boost control system, reference is again made to the aforesaid patent of Hubert T. Sparrow et al.

With the turbo boost control system working as previously related, attention may now be directed to the cabin boost control. The pressure to be maintained in the cabin, as before mentioned, is normally controlled by pressure regulating means, not shown, which control the flow of air from the cabin. Assume that a cabin pressure of 22 inches of mercury is to be maintained, this pressure corresponding to an altitude of about 8,000 feet. Control means 394 may be adjusted to a position of relatively low flow so that, for example, switch arm 303 will engage contact 306 when the differential of pressure between tubes 15 and 337 is less than 1 in. of mercury and, when the differential pressure rises to 2 in. of mercury or more, arm 303 will engage contact 305. With turbo boost selector 12 adjusted to give only a 4 volt positive signal, it is noted that the turbo-superchargers are operating to provide a relatively high induction pressure. This pressure may be considered to be well above the 22 in. of mercury cabin pressure being maintained, so the pressure in tube 337 rises more than 2 in. of mercury above that in tube 15 and switch arm 303 is moved into engagement with contact 305. Let it be assumed that wiper 388 remains in its previously adjusted position, and that switch 381 is moved to its "on" position. Under these circumstances, the only circuits to windings 379 and 380 will include resistors 385 and 386, respectively. The circuit through winding 379 is from terminal 51 through wire 52, resistor 385, winding 379, wire 389, wire 55, and terminal 54. At the same time, current is flowing from terminal 51 through wire 52, wire 353, resistor 386, wire 387, winding 380, wire 389, wire 55, and terminal 54. Thus, each of the resistors are in series with their respective windings and there is no operation on the motor, arm 303 remains at its extreme left position and cabin boost control 11 adds no signal to the turbo boost control system.

It is now seen that when the aircraft is operated at high power outputs, the discharge pressure tends to remain higher than that necessary to maintain proper air flow into the cabin and the cabin boost control has no effect on the control of the turbo-supercharger. If the airplane levels off for cruising at about 10,000 foot elevation, high power output may no longer be demanded and the turbo boost selector may be adjusted for a lower supercharger discharge pressure. Assume that wiper 22 is adjusted to position 5 about midway across resistor 21 so that wire 30 now becomes about 15 volts positive relative to wiper 22. If cabin boost control 11 be ignored, then the output signal of the turbo boost selector is equal to the 15 volts less than the 2 volts of the calibrating potentiometers, in other words, 13 volts positive. The increase in positive signal from the turbo boost selector tends to cause an opening movement of the waste gate 316 and this in turn permits the supercharger discharge pressure to drop. As the discharge pressure drops, wiper 368 of the induction pressure responsive controller moves to the right and, assuming that there is neither excessive acceleration nor overspeed, wipers 360 and 351 tend to assume the positions shown on the drawing. Assuming that the discharge pressure drops to about 20 in. of mercury and that wiper 363 is about ⅔ of the way across resistors 365, moving from the left, then it appears that wiper 360 is about 20 volts negative relative to 368 and the output from network 313 is 20 volts negative. With a positive 13 volt signal from the turbo boost selector, and a negative 20 volt signal from network 313 due to drop in induction pressure, only a 7 volt positive signal is required from network 312 to balance the networks. Therefore, motor 318 is operated in a waste gate opening position due to the output of network 312 being, in its previous condition, more than 7 volts positive. This opening movement will continue until wiper 344 is only 7 volts positive relative to wiper 351. The turbo boost control system thus tends to balance out to provide a turbo-supercharger discharge pressure of about 20 inches of mercury, as previously noted. However, this is noted to be insufficient for furnishing the desired airflow and it is obvious that the differential of pressure between tubes 15 and 337 has vanished. Thus, switch arm 303 is moved into engagement with contact 306 by spring means 304 and resistor 386 in series with field winding 380 is shunted by a circuit from terminal 51, wire 52, wire 338, switch 381, wire 349, arm 303, contact 306, wire 392, limit switch 383, wire 399, wire 397, winding 380, wire 389, wire 55, and terminal 54. With resistor 386 shunted out and resistor 385 in its series relation with winding 379, motor 307 is operated to drive wiper 309 to the right across resistor 387. With a 15 volt potential existing between wiper 22 and wire 30, it is now noted that the same potential of 15 volts exists across resistor 387. At the extreme left position, wiper 309 is at the same potential as wire 30, but as it moves to the right, it becomes less positive relative to the ground and, at the extreme right is at ground potential. Assume that 309 is now at a position midway across resistor 387. In this position, wiper 309 is now 7½ volts negative relative to wire 30. Wiper 309 is connected by wire 393 through wiper 388, wire 394, terminal 395, wire 396, terminal 378, wire 377, to the right-hand extreme of resistor 374. It was previously noted that wiper 375 is 2 volts negative relative to the right-hand extreme of said resistor so wiper 375 is now at a potential of 5½ volts positive relative to wiper 22 and the voltage signal from turbo boost selector becomes only 5½ volts instead of the previous 13 volts. The reduction in positive signal from turbo boost selector 12 causes the negative signal of network 313 to cause motor 318 to operate in a direction to close waste gate 316. Closing waste gate 316 again raises the turbo-supercharger discharge pressure and causes the differential of pressure between tubes 15 and 337 to rise. Assuming that this differential becomes 1½ in. of mercury, then arm 303 is moved midway between contacts 305 and 306 and neither resistor is shunted out of its circuit. With neither resistor shunted out, the currents supplied the windings of motor 307 are of like phase and the motor stops operating. Wiper 309 then remains at about its mid-position on resistor 387.

Had wiper 22 been adjusted to the extreme left of resistor 21, and wire 30 at a potential 30 volts above said wiper 22, then there would have been a 30 volt drop across resistor 387 and wiper 309 in its mid-position on resistor 387 would be 15 volts negative relative to wire 30, or 13 volts positive relative to wiper 22. Had wiper 22 been adjusted to a position 28 volts positive relative to the left of resistor 21, so that normally there would be no signal of any sort from turbo boost selector 12, then there would be no voltage drop across resistor 387 and the position of wiper 309 would be of no effect.

It is apparent that the ability of cabin boost control 11 to modify the operation of the turbo-supercharger control system is dependent on the position of wiper 22. This feature is of considerable importance for it provides a positive safeguard against increasing induction pressure to an unduly high value and thus endanger the engine. For instance, if the airplane were operating at a condition previously described wherein the induction pressure was about 20 inches of mercury, and cabin boost control 11 was compensating the control of the inboard engines to increase their induction pressure to about 23 inches of mercury, an emergency might arise which would require full engine power. To get full power, the pilot would fully open the throttles of engines 2 and 3, assuming that they were partly closed to keep their actual power output the same as the outboard engines even though their induction pressures were above those of the outboard engines, and would adjust the turbo boost selector to its point of maximum power. While the added induction pressure and the increased differential pressure across tubes 15 and 337 would actuate arm 303 to cause motor 307 to move wiper 309 to the left, this operation would take some time, because of the relative slow motion of wiper 309 due to gear box 308. In the meantime, if the voltage signal from turbo boost selector 12 was made less positive by action of cabin boost control 11, the waste gate of the inboard engine or engines may be closed too far and result in damage to the turbo-supercharger or to the engine due to excessive pressures. However, with the present apparatus, as wiper 22 is moved to the right, and the positive signal is diminished, the voltage drop across resistor 387 and the compensating effect of cabin boost control 11 is likewise diminished. The present cabin boost control is thus seen to be inherently safe.

In the above operation, it was assumed that the operation of the cabin boost control resulted in the induction pressure assuming such a value that the switch arm 303 moved to a point midway between contacts 305 and 306. Now let it be assumed that either because of a change in the setting of the turbo boost selector or for some other reason, the induction system pressure rises with respect to the cabin pressure so as to cause the switch blade 303 to move back into engagement with contact 305. Under previous conditions, limit switch 382 was open due to the slider 309 being in its extreme left hand position relative to resistor 387. In view of the fact, however, that the slider 309 has been moved to an intermediate position, limit switch 382 is now closed with the result that a circuit is established to the motor field winding 379 independently of resistor 385 and shunting out resistor 385. This circuit is as follows: from terminal 51 through conductors 52 and 338, switch 381, conductor 349, switch blade 303, contact 305, conductor 339, limit switch 382, conductor 357, motor field winding 379, and conductors 389 and 55 to terminal 54. Under these conditions, the circuit to winding 379 does not include resistor 385 while the circuit to winding 380 includes resistor 386. Thus, the current through field winding 380 will now lead that through winding 379 with the result that the motor will be caused to rotate in such a direction as to drive slider 309 to the left. This will have the opposite effect to the movement of slider 309 to the right, previously considered. In other words, the effect of this will be to bring the potential of the right hand terminal of resistor 314 of the calibrating potentiometer more nearly that of conductor 30 so as to tend to lower the induction pressure. This is desirable because with slider 309 in the position previously indicated, the induction pressure is higher than necessary for engine supercharging purposes. In this connection, it is to be borne in mind that if the increase in induction system pressure was occasioned by a movement of slider 22 to the right, this decrease in the effect of the cabin boost control would take place more or less automatically because of the decrease in the voltage across the resistor 387 of the cabin boost control potentiometer, as explained above. Thus, upon the raising of the setting of the turbo boost control, there is an immediate decrease in the effect of the cabin boost control and as soon as the induction system pressure starts to rise as a result of the movement of the turbo boost selector, the cabin boost control is immediately placed into operation to reduce the induction system pressure to that just necessary to maintain the desired differential.

The limit switches 382 and 383 are provided for limiting the driving of the slider 309 by the motor 307. Upon the slider approaching either extreme position, the appropriate limit switch is opened. Each of these limit switches is in series with one of the shunt circuits so that upon this limit switch being opened, that shunt circuit, the closure of which is causing rotation of the motor, is opened.

If desired, a signal light 394 may be operated by a second throw on limit switch 383 to indicate when wiper 309 has moved to its extreme right of travel and thus indicates that no more compensation can be added to the system automatically. Further, wiper 388 may be adjusted across resistor 392 to diminish the effect of movement of wiper 309 across resistor 387 in decreasing the positive signal from turbo boost selector 12. The right end of resistor 392 is connected to wire 62, and therefore is at the same potential as wire 30, while the left end of resistor 392 is connected by wire 393 to wiper 309. When wiper 388 is at its left extreme, there is no potential drop across resistor 392 whereas, if wiper 309 is at its extreme right of travel, then there is the same potential difference across resistor 392 as exists between wire 30 and wiper 22. When wiper 388 is at its left extreme, it is at the same potential as wiper 309 whereas, if it is intermediate the extremes of resistor 392, it assumes a potential value intermediate that existing between wire 30 and wiper 309. The relative effect of cabin boost control 11 in modifying the turbo boost control system may thus be manually adjusted by movement of wiper 388 across resistor 392. In the position for wiper 388 shown, cabin boost control 11 has maximum authority in modifying the turbo boost control system, whereas, if wiper 388 is moved to its extreme right, cabin boost control 11 would have no compensating effect.

Briefly summarizing, it is noted that the present cabin boost control apparatus responds to the rate of airflow into the aircraft cabin and automatically compensates an electronic turbo-supercharger control system in such a manner as to maintain the rate of airflow between predetermined limits. The authority of the cabin boost control may be manually adjusted and further is under complete dominance of the turbo boost selector of the turbo-supercharger control system. Adjustment of the turbo boost selector of the control system to raise induction pressure automatically reduces any compensation being added to the system by the cabin boost control.

In studying the foregoing description and recital of operation of the present invention, many substitutions and equivalents become apparent to those skilled in the art. Further, while certain values have been given and various apparatus rather specifically described, it should be kept in mind that this has been done in the interest of properly describing the present apparatus and that the scope of the present invention is to be determined only by the appended claims.

I claim as my invention:

1. In an electrical control network, a plurality of individual circuits, common means for simultaneously adjusting all of said circuits, means for modifying the control of one of said circuits, and means connecting said modifying means into said one circuit in such a manner that the authority of said modifying means is dependent on the adjustment of said common means.

2. In a compound electrical network, a plurality of individual networks; an adjustable control network common to all of said individual networks for simultaneously adjusting same, means for modifying the adjustment of one of said individual networks, and means connecting said modifying means to said adjustable control network so that rate of modification permitted by said modifying means is dependent on the adjustment of said control network.

3. In an aircraft having a plurality of devices to be controlled, individual control systems for each of said devices, means responsive to a condition indicative of a need for operation of a device for adjusting the control system of said device, means common to each of said systems for simultaneously adjusting all of said systems, and means connecting said condition responsive means to said common means in such a manner that the rate of adjustment of said condition responsive means is dependent on the adjustment of said common means.

4. In a turbo-supercharger control system, a manually adjustable source of electrical potential for adjusting said control system, means responsive to a condition indicative of the operation of said supercharger for varying said potential, and circuit means connecting said responsive means into said control system in such a manner that the rate at which said condition responsive means may vary said potential is dependent on the adjustment of said manually adjustable source.

5. In an aircraft having a pressurized cabin, an engine having a turbo-supercharger for supplying air thereto, said supercharger also supplying air to said cabin, electrical apparatus including a manually adjustable impedance means for regulating the discharge pressure of said turbo-supercharger, means responsive to the flow of air to said cabin, second impedance means adjusted by said flow responsive means, and circuit means connecting said impedances and said apparatus in such manner that an adjustment of either of said impedances may require an increase in turbo-supercharger operation but so that an increase in operation caused by said second impedance is dependent on the adjustment of said manually adjusted impedance means.

6. In an electrical control network, a first voltage divider including an impedance, a voltage supply and an output connection means; a second voltage divider including an impedance and having an output connection means, and means connecting the impedance means of said second voltage divider in series with the impedance means and the output connection means of the first named voltage divider.

7. In an electrical control circuit, a network having an input current supply and providing output signal potentials, said network including a manually adjustable potentiometer means and an automatically adjusted potentiometer, said manually adjustable potentiometer varying said signal output potentials from high to low values, said automatically adjusted potentiometer being capable of varying the value of said output signal potentials an appreciable amount when said manually adjustable potentiometer is adjusted for a high value of signal potential but being capable of modifying the value of the output signal a decreasing amount as the manually adjustable potentiometer is adjusted for lower potential output signals.

8. In an aircraft having a supercharged enclosure, a plurality of engines, a turbo-supercharger for each engine for supplying air thereto, at least one of said superchargers also supplying air to said enclosure, electric motor means for controlling each of said superchargers, electrical circuit means including control devices for simultaneously controlling the operation of each of said motors and thus controlling the discharge pressures of said superchargers, said electrical circuit means controlling said motors in response to the voltage and phase relations of currents flowing in said circuit means, means responsive to the flow of air to said enclosure from said one supercharger, manual adjusting means for said circuit, and means actuated by said flow responsive means for adjusting the electrical circuit means in its control of the motor controlling said one supercharger, said actuated means being arranged to cause adjustments of said circuit up to a relatively large amount when said manual adjustment means is adjusted to provide a low discharge pressure and to cause no more than a relatively small adjustment of said circuit when said manual means is adjusted to provide a high discharge pressure.

9. In an aircraft having a pressurized enclosure, a plurality of engines, a supercharger for each engine for supplying air thereto, reversible electric motor means for controlling each of said superchargers, electric circuit means including control devices for regulating the operation of said motors and thereby the operation of said superchargers, one of said control devices comprising a pressure selector means manually adjustable from low to high pressure settings for causing said superchargers to supply air under lower or higher pressures to said engines, at least one of said superchargers also supplying air to said enclosure, means responsive to the flow of air to said enclosure, and voltage modifying means adjusted by said flow responsive means, said voltage modifying means being connected in said circuit in a manner to modify the operation of said one supercharger, the permissible amount of such modification being diminished by adjusting said pressure selector means to higher settings.

10. In an aircraft having engines equipped with turbo-superchargers and having a pressurized cabin, at least one of said turbo-superchargers supplying air to its associated engine and to said cabin, control means for each of said turbo-superchargers, manual adjustment means for simultaneously adjusting each of said control means, means responsive to the air flow from said one supercharger to said cabin, means adjusted by said flow responsive means for modifying said control means for said one supercharger in a manner to maintain said air flow above a predetermined value, and means connecting said adjusted means into said control means in such manner that the modifying ability of said adjusted means is dependent on the manual adjustment of said control means.

11. Control apparatus for an aircraft having an engine and a supercharger therefor and a pressurized cabin receiving air from said supercharger, said supercharger being normally controlled by an electrical system; comprising, in combination, means responsive to a condition indicative of air flow to said cabin, reversible power means controlled by said flow responsive means, impedance means adjusted by said power means, and means connecting said impedance means into the normal electrical control system of the supercharger.

12. In an electrical control system, a plurality of electrical networks, a voltage divider having an end connection and an intermediate connection, means impressing a potential across said voltage divider, one of said networks being connected to said end connection, a second voltage divider having end connections and an intermediate connection, the end connections of said second voltage divider being connected in series with the end connection and intermediate connection of the first voltage divider, the intermediate connection of the second voltage divider being connected to another of said networks, the degree of control exercised by said second voltage divider being dependent on the adjustment of the intermediate connection of the first divider.

13. In an aircraft having a plurality of engines each equipped with a supercharger, an individual device for controlling each of said superchargers, individual control systems for each of said devices, means responsive to a condition indicative of the operation of a supercharger for adjusting the control system for the device controlling said supercharger, means common to each of said systems for simultaneously adjusting all of said systems, and means connecting said condition responsive means to said common means in such a manner that the rate of adjustment of said condition responsive means is dependent on the adjustment of said common means.

14. In an aircraft having an engine equipped with a turbo supercharger, a device for controlling said supercharger, a control system for said device, a manually adjustable source of electrical potential for said system, means responsive to a condition indicative of the operation of said supercharger for varying said potential, and circuit means for varying the rate at which said condition responsive means may vary said potential dependent on the adjustment of said manually adjustable source.

15. In an aircraft having a plurality of power means; a control device for each of said power means; and an electrical control system for said devices comprising, in combination, an individual electrical network for each of said devices, a voltage divider having an end connection, means impressing a potential across said voltage divider, one of said networks being connected to said end connection, a second voltage divider having end connections and an intermediate connection, the end connections of said second voltage divider being connected in series with the end connection and intermediate connection of the first voltage divider, the intermediate connection of the second voltage divider being connected to another of said networks, the degree of control exercised by said second voltage divider being dependent on the adjustment of the intermediate connection of the first divider.

DANIEL G. TAYLOR.

REFERENCES CITED

The following references are of record in the file of this patent:

UNITED STATES PATENTS

| Number | Name | Date |
|---|---|---|
| 1,930,911 | Stoller | Oct. 17, 1933 |
| 2,002,057 | Gregg | May 21, 1935 |
| 2,039,851 | Silverman | May 5, 1936 |
| 2,115,827 | Powell | May 3, 1938 |
| 2,208,554 | Price | July 16, 1940 |
| 2,218,925 | Roberts | Oct. 22, 1940 |
| 2,265,461 | Wagner | Dec. 9, 1941 |
| 2,284,984 | Nixon | June 2, 1942 |
| 2,315,923 | Bellows | Apr. 6, 1943 |
| 2,337,933 | Rogers | Dec. 28, 1943 |
| 2,350,896 | Jde | June 6, 1944 |
| 2,353,201 | Talbot | July 11, 1944 |